(12) United States Patent
Schmidt-Karaca et al.

(10) Patent No.: US 8,572,369 B2
(45) Date of Patent: Oct. 29, 2013

(54) SECURITY FOR COLLABORATION SERVICES

(75) Inventors: Markus Schmidt-Karaca, Heidelberg (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 628 days.

(21) Appl. No.: 12/636,489

(22) Filed: Dec. 11, 2009

(65) Prior Publication Data
US 2011/0145571 A1 Jun. 16, 2011

(51) Int. Cl.
*H04L 29/06* (2006.01)

(52) U.S. Cl.
USPC .......................................................... 713/160

(58) Field of Classification Search
USPC ............................ 713/160, 165, 167; 709/204
See application file for complete search history.

(56) References Cited

U.S. PATENT DOCUMENTS

| | | | | |
|---|---|---|---|---|
| 6,378,072 | B1 * | 4/2002 | Collins et al. | 713/187 |
| 7,609,721 | B2 * | 10/2009 | Rao et al. | 370/470 |
| 7,940,713 | B2 * | 5/2011 | Jin et al. | 370/316 |
| 7,945,622 | B1 * | 5/2011 | Pegg | 709/204 |
| 8,014,421 | B2 * | 9/2011 | Rao et al. | 370/470 |
| 2006/0037072 | A1 * | 2/2006 | Rao et al. | 726/14 |
| 2006/0039354 | A1 * | 2/2006 | Rao et al. | 370/352 |
| 2009/0089379 | A1 * | 4/2009 | Pegg | 709/206 |
| 2009/0215477 | A1 * | 8/2009 | Lee et al. | 455/466 |
| 2009/0327714 | A1 * | 12/2009 | Yaghmour | 713/168 |

* cited by examiner

*Primary Examiner* — Samson Lemma
(74) *Attorney, Agent, or Firm* — Schwegman Lundberg & Woessner, P.A.

(57) ABSTRACT

Various embodiments, in the form of at least one of systems, methods, and software, are provided that include security solutions for use of collaboration services. Some embodiments include encrypting data to be sent to and stored by a collaboration service. These and other embodiments include capturing, within a computer application used to post data to a collaboration service, data to be sent to the collaboration service, encrypting the captured data, and returning the data in an encrypted form to the computer application for posting to the collaboration service.

18 Claims, 5 Drawing Sheets

SECURITY FOR COLLABORATION SERVICES

BACKGROUND INFORMATION

Various collaboration tools have become a new standard for communication and collaboration over the internet. Examples are social networks such as the FACEBOOK website and services of Facebook, Inc., the TWITTER website and services of Twitter, Inc., and GOOGLE WAVE of Google, Inc. Other examples are non-social networks such as the collaboration services available with the ACROBAT® product of Adobe, Inc. These products and services offer capabilities that have the potential to be very useful for business purposes. However, these tools include an important drawback in that information communicated through such communication and collaboration services is disclosed and can be at risk to be compromised. The potential for exposing organizational confidential information is too great of a risk for organizations to utilize such products and services for organizational communication and collaboration. Further, information shared via such products and services is subject to privacy and usage agreements of these products and services. The terms of the privacy and usage agreements are subject to change. Although such products and services offer certain security features, the risks involved in using these products and services are too great. To mitigate potential exposures, organizations do not allow for the use of these communication and collaboration services over the Internet.

DETAILED DESCRIPTION

In an example embodiment, an organization, such as a company, plans to share data among their employees via a social network or other communication or collaboration service. As used herein, "collaboration service" commonly refers to both communication and collaboration services that are offered as at least one of a product and service via a network, such as the Internet. Such collaboration services include products and services offered by organizations such as Facebook, Inc. through the FACEBOOK website and services, Twitter, Inc. via the TWITTER website and services, Google, Inc. via the GOOGLE WAVE services and products, Adobe, Inc. via the ACROBAT product and services, and others organizations, products, and services. Some of these collaboration services are accessible through a web browser, while others are accessible through specific applications. A generalization that can be made about each of these collaboration services is that they each include at least one of a client-side Application Programming Interface (API), a client-side defined specification, or a client-side application plug-in for use in communicating with these collaboration services accessible via the Internet. The API, client-side defined specification, or a client-side application plug-in of the collaboration services specify how various data types are to be sent to and received from the collaboration service, and may further specify other data processing functions. In some embodiments, where the client-side application for accessing the collaboration service is a web browser, the client-side API may be standard web protocols that are leveraged by web browser plug-ins. In the example embodiment of the organization that plans to share data among their employees via a collaboration service, the API, defined specification, or application plug-in for communicating with these collaboration services is leveraged.

In this example embodiment, the collaboration service is leveraged by augmenting the functionality of a computer application within the organization to allow the computer application to receive organization-confidential information for posting or sharing via a collaboration service and to receive and view the posted or shared organization-confidential information while protecting the confidential nature of the information. In such embodiments, the organization-confidential information is transmitted to and received from the collaboration service without the information being compromised during transit, while stored by the collaboration service, or when retrieved by users who are not members of the organization or are otherwise not authorized to view the information. The computer application receiving the organization-confidential information is augmented, such as with an application plug-in or modification of the computer application, to capture data to be sent to the collaboration service prior the data being sent. The captured data will usually include addressing data, such as headers and metadata, and a data payload including the organization-confidential information. The data payload is copied from the captured data and sent to an encryption service. The encryption service is typically a process that executes on a server within a networked computing environment of the organization. The encryption service is typically not accessible outside of the organization's network computing environment. The encryption service operates to receive data to encrypt from a requestor, encrypts the data according to an encryption key that only the encryption service has possession of, and returns the data to the requestor in an encrypted form. Thus, the data payload after being copied and sent to the encryption service is received back in an encrypted form. The data payload of the captured data is then replaced with the data payload in the encrypted form. The captured data is then returned to the computer application for transmission to the collaboration service.

When the information is sent the collaboration service, the data may be sent via HTTP, HTTPS, or other protocol as required or as otherwise specified by the collaboration service. Regardless of the protocol used in sending the data including the encrypted data payload to the collaboration service, the organization-confidential information is secure as the data payload is encrypted using a key possessed only by the encryption service of the organization. When the data is received by the collaboration service, the collaboration service typically stores the data in manner in which the data may be retrieved by other users of the collaboration service. When another user retrieves data including the organization-confidential information from the collaboration service, the organization-confidential data is still secure, as the collaboration service does not possess the encryption key. However, when the user is a member of the organization and has access to the encryption service, that user may be able to view the organization-confidential information. For example, if that user has the appropriate application augmented with functionality, such as through a computer application plug-in or adaptation of the computer application to decrypt the data. For example, the computer application plug-in or adapted computer application may capture data received from the collaboration service prior to the received data being displayed and determine if the received data includes a data payload encrypted by the encryption service. If the data payload in the data received from the collaboration service is encrypted by the encryption service, the encrypted data payload is copied and sent to the encryption service to be decrypted. The data payload is received back after being decrypted. The encrypted data payload of the received data is then replaced with the decrypted data payload and the data is then forwarded on in the processing order of the computer application. The computer application is then able to provide the user with a view of the organization-confidential data.

These and other embodiments are described in detail below with reference to the figures. In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
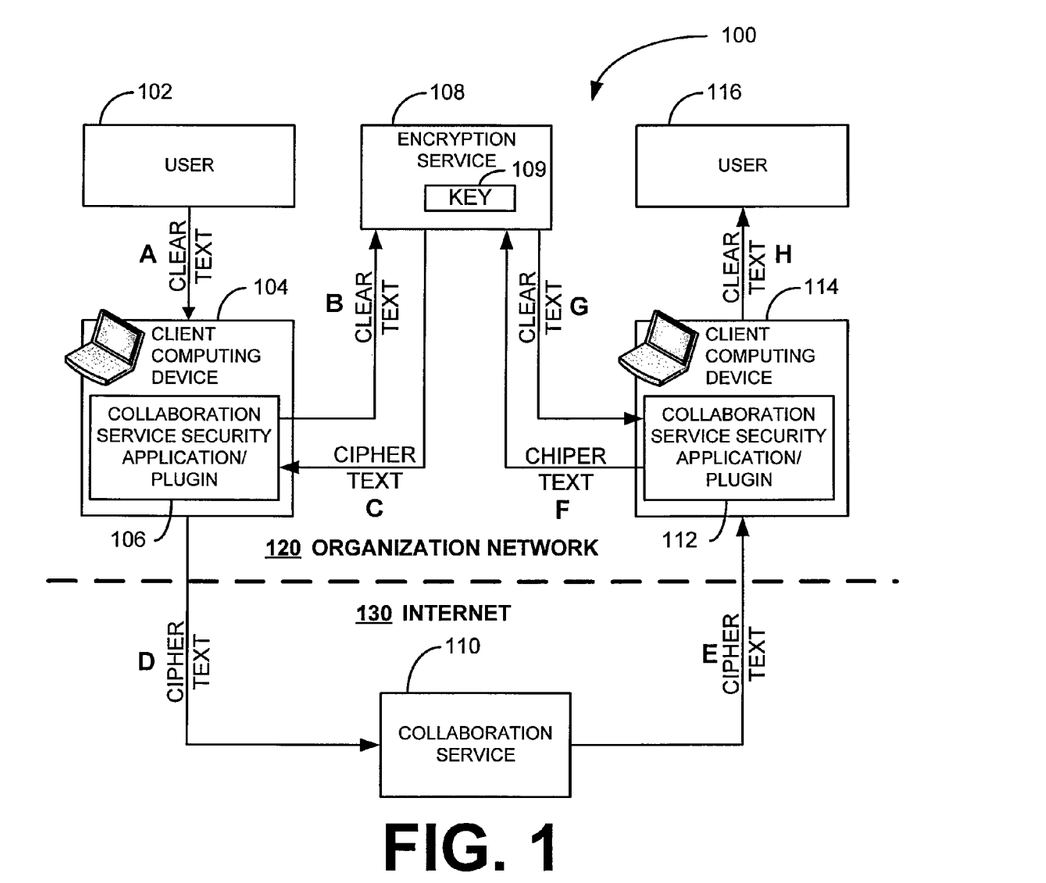
FIG. 1 is a logical block diagram illustrating an architecture of a system according to an example embodiment.

FIG. 1 is a logical block diagram illustrating an architecture of a system 100 according to an example embodiment. The system includes client computing devices 104, 114 each including a collaboration application 106, 112 that is augmented with collaboration service security through tailoring of the application 106, 112, an application 106, 112 plug-in providing collaboration service security functionality, or otherwise utilizes collaboration service security functionality as described herein. The system 100 also includes an encryption service 108, which possesses an encryption key 109. The system 100 further includes a collaboration service 110.

The client computing devices 104, 114 are connected to a network including connectivity to an organization network 120 and the Internet 130. The collaboration service is connected to the Internet 130. Thus, the client computing devices 104, 114 are able to communicate with the collaboration service 110 via the Internet 130. In some embodiments, the collaboration service 110 may instead be connected to another network, such as the organization network 120 or other network to which the client computing devices 104, 114 are also connected.

In some embodiments, the client computing devices 104, 114 may be personal computers, netbook computers, handheld computing devices, smart phones, or other computing devices.

The encryption service 108 is typically a service that executes on a server computer connected to the organization network 120. The encryption service 108 is operable to receive clear text from a requesting collaboration application 106, 112, encrypt the clear text according to the key 109 to generate cipher text, and return the cipher text to the requesting collaboration application 106, 112. The encryption service 108 is also operable to receive cipher text from a requesting collaboration application 106, 112, decrypt the clear text according to the key 109 to generate clear text, and return the clear text to the requesting collaboration application 106, 112. In some embodiments, the encryption service 108 requires a user 102, 116 of the requesting collaboration application 106, 112 to be authenticated within the organization network 120 or to provide authentication credentials to the encryption service 108. Absent authentication, the encryption service 108 in such embodiments will not perform the requested encryption or decryption. In some embodiments when the encryption service 108 requires user authentication through provision of credentials, the encryption service 108 may be accessible via the Internet 130.

The encryption key 109 in some embodiments is a symmetric encryption key. The strength of the encryption key is dependent upon the particular embodiment and a degree of security desired by an organization implementing the system 100. An asymmetric encryption key may be used in other embodiments.

In some embodiments, based on the identity of particular authenticated users, different encryption keys may be utilized. In such embodiments, different levels of security can be implemented to allow different levels of employees or other users to view only organization-confidential information posted to the collaboration service 110 they are authorized to view.

The collaboration applications 106, 112 may take several forms. One form is a web browser and a web browser plug-in that determines if the source of inbound data is the collaboration service 110. In such embodiments, the plug-in is tailored to the specific collaboration service 110. In some embodiments, there may be multiple plug-ins, each plug-in tailored according to the specifications for communication with a particular collaboration service 110. For example, one plug-in may be tailored to the FACEBOOK collaboration service and another plug-in tailored to the LINKEDIN collaboration service.

In other embodiments, the collaboration applications 106, 112 may be a rich Internet application including user interfaces displayable within another application, such as a web browser, or as standalone applications. The rich Internet applications may be encoded in a language executable within a runtime environment on the client computing devices 104, 114. The language may be JAVA executable within the JAVA runtime environment from Sun Microsystems, Inc., FLEX or ACTION SCRIPT executable within the FLASH runtime environment from Adobe Systems, Inc., a language executable within the SILVERLIGHT runtime environment from Microsoft, Inc., or other runtime environment. In other embodiments, the collaboration applications 106, 112 may be standalone client applications executable on the particular client computing device 104, 114 upon which it may be deployed.

The collaboration applications 106, 112 are operable to receive input from users for posting to the collaboration service 10 and to retrieve and display information from the collaboration service 110. In some embodiments, the collaboration applications 106, 112 include additional functionality and capabilities, such as providing access to an enterprise resource planning (ERP) application, such as an application available from SAP AG of Waldorf, Germany. In some embodiments where the collaboration applications 106, 112 include ERP application functionality, the collaboration applications 106, 112 when presenting ERP application data provide tools to designate displayed data for posting to the collaboration service 110. Some such embodiments may further include the ability to generate reports or other documents within an ERP application from the collaboration applications 106, 112 for the specific purpose of posting to the collaboration service 110. Additional ERP application functionality may be included in the collaboration applications 106, 112 depending on the needs for the specific embodiment.

In use, collaboration application 106 executing on the client computing device 104 receives clear text input A including organization-confidential information from a user 102. The user 102 provides the clear text input A through a user interface of the collaboration application 106, such as the user interface illustrated and described with regard to FIG. 4. The collaboration application 106 in some embodiments treats all received input as organization-confidential information. In other embodiments, the user 102 designates the input as organization-confidential information through selection of a user interface control.

Following receipt of the clear text input A from the user 102, the collaboration application 106 receives additional input from the user 102 including a command to post the clear text input A to the collaboration service 110. Following receipt of the command to post the clear text input A to the collaboration service 110, the collaboration application 106 prepares the clear text input A for posting to the collaboration service 110.

In some embodiments, the collaboration application 106 as part of preparing the clear text input A for posting will send the clear text input B to the encryption service 108 to be encrypted using the encryption key 109. The encryption service 108 through the encryption process generates and returns a cipher text C to the collaboration application 106. The cipher text C is the clear text input A received from the user 102, only in an encrypted form. The collaboration application 106 then transmits the cipher text D to the collaboration service 110.

In other embodiments of the collaboration application 106 that include an application plug-in, following receipt of the command to post the clear text input A to the collaboration service 110, the collaboration application 106 prepares the clear text input A for posting to the collaboration service 110. Either during the preparation of the clear text input A or immediately prior to transmission of the clear text input A to the collaboration service 110, the application plug-in interrupts the collaboration application 106 and captures the data prepared by the collaboration application 106 for transmission to the collaboration service. The application plug-in then copies a data payload from captured data. The copied data payload includes the clear text input A received from the user 102. The application plug-in then sends copied data payload including the clear text input B to the encryption service 108. The encryption service encrypts data payload including the clear text input B to generate a cipher text form of the data payload. The cipher text C form of the data payload is then sent back to the application plug-in. The application plug-in then replaces the data payload of the captured data with the cipher text C form of the data payload. Control of processing is then returned to the collaboration application 106 to allow processing of the data for posting to the collaboration application 110 to continue. The collaboration application 106 then transmits the cipher text D to the collaboration service 110.

The collaboration service 110 is now in possession of the organization-confidential information initial input as clear text A by the user 102. However, the information is encrypted and therefore has not been compromised. The collaboration service 110 will process the data as any other data it receives as the collaboration service 110 only cares that received data in the proper format and is communicated properly. If someone were to view the data, regardless of the type of data (text, image, etc.), it would be unintelligible due to the encryption.

Subsequently, another user 116 requests the organization-confidential information from the collaboration service 110. The request for the organization-confidential information may be an explicit request or a request for recent posting to the collaboration service in a feed of the user 116. In either case, the collaboration service 110 responds by sending the cipher text E of the organization-confidential information to the collaboration application 112 of the user 116.

In some embodiments, the collaboration application 112 evaluates data received from the collaboration service 110. The evaluation of the data includes determining if the source of the received data is the collaboration service and if the received data includes an encrypted data payload. If the source is the collaboration service and an encrypted data payload is included, the collaboration application 112 copies the encrypted data payload and sends the copy to the encryption service 108 as cipher text F. The encryption service 108 decrypts the cipher text F using the encryption key 109 and returns clear text G. The clear text G is the data payload in a decrypted form. Thus, the collaboration application 112 following receipt of the clear text G replaces the data payload of the data received from the collaboration service 110 with the clear text G. The collaboration application 112 then continues to process and eventual present a view of the data received from the collaboration service 110, including a view of the organization-confidential information.

In other embodiments of the collaboration application 112 that include an application plug-in, the application plug-in interrupts the collaboration application 112 upon receipt of data for presentation. The application plug-in captures data received by the application and determines if the data was received from the collaboration service 110 and if the data includes an encrypted data payload. When the data was received from the collaboration service 110 and includes an encrypted data payload, the application plug-in sends a copy of the encrypted data payload as cipher text F to the encryption service 108 to be decrypted. The encryption service 108 decrypts the cipher text F using the encryption key 109 and returns clear text G. The clear text G is the data payload in a decrypted form. The application plug-in then replaces the encrypted data payload (cipher text E) within the received data with a decrypted data payload received from the encryption service 108. The application plug-in then returns the received data, including the decrypted data payload, to the collaboration application 112. The collaboration application then continues to process and eventual present a view of the data received from the collaboration service 110, including a view of the organization-confidential information.

Figure 2:
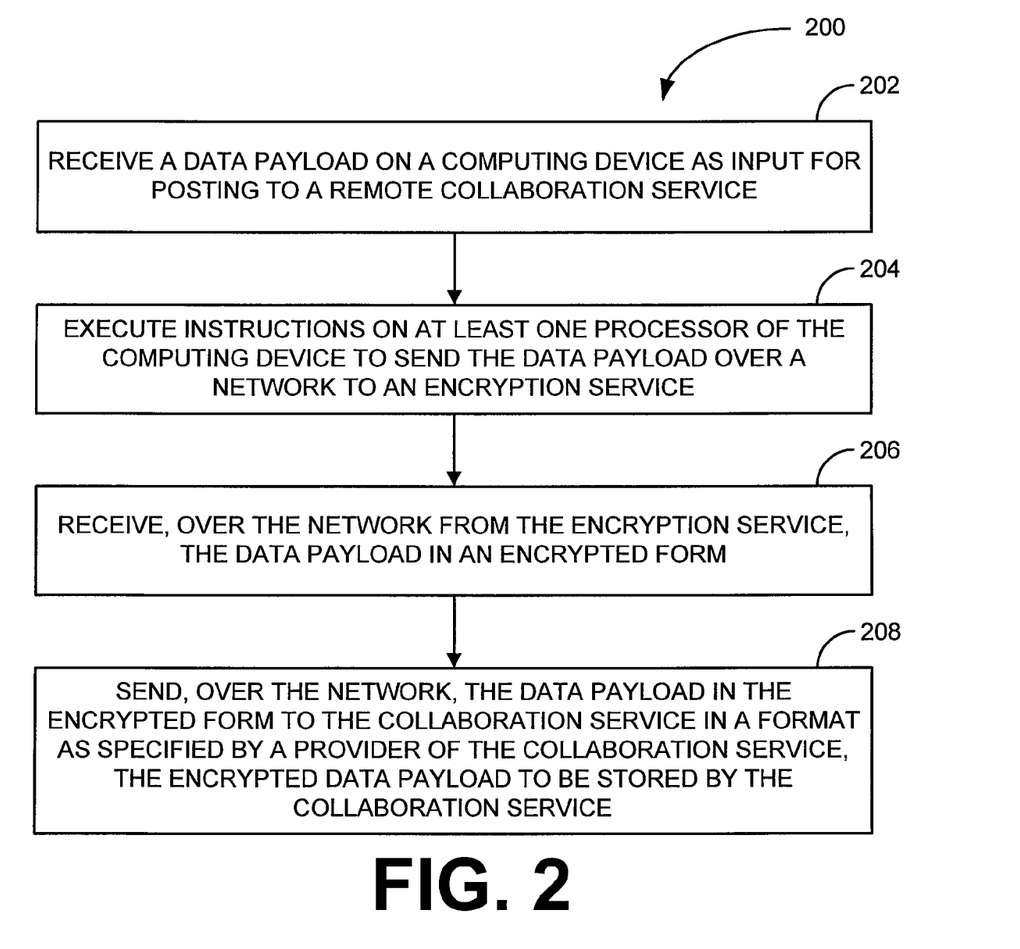
FIG. 2 is a block flow diagram of a method according to an example embodiment.

FIG. 2 is a block flow diagram of a method 200 according to an example embodiment. The method 200 is a computerized method that may be performed by a collaboration application, a collaboration application plug-in, a web-browser plug-in, or other application, plug-in, or process when receiving data for posting to collaboration service. The method 200 includes receiving 202 a data payload on a computing device as input for posting to a remote collaboration service. The method 200 further includes executing 204 instructions on at least one processor of the computing device to send the data payload over a network to an encryption service and in response from the encryption service, receiving 206 the data payload in an encrypted form. The method 200 also includes sending 208, over the network, the data payload in the encrypted form to the collaboration service. The data payload is sent 208 to the collaboration service in a format as specified by a provider of the collaboration service. In typical embodiments, the encrypted data payload is be stored by the collaboration service.

In some embodiments of the method 200, the data payload is received 202 as a data chunk created by an application performing the method 200 according to a transfer protocol of the collaboration service. For example, the data payload may be received in a data packet. In other embodiments, prior to transmission of data for posting to the collaboration service, the size of the data may be evaluated in view of data size limit specifications of the collaboration service. The data chunk size may be set based on a functionality of a collaboration service being utilized. For example, some functionalities, when utilized, may aim to provide near-real-time collaboration, such as sharing data at the granularity of keystrokes on a keyboard. The data chunks in such embodiments will be quite small in comparison to the data chunks involved with sharing an image or video. In yet other embodiments, the size of the data chunks is set according to a data transfer protocol specified by the particular collaboration service utilized. If the size of the data to be posted exceeds a size limit, the data may be broken into data chunks according to the requirements of the collaboration service. In some such embodiments, each data chunk may then be processed according to the method 200.

Figure 3:
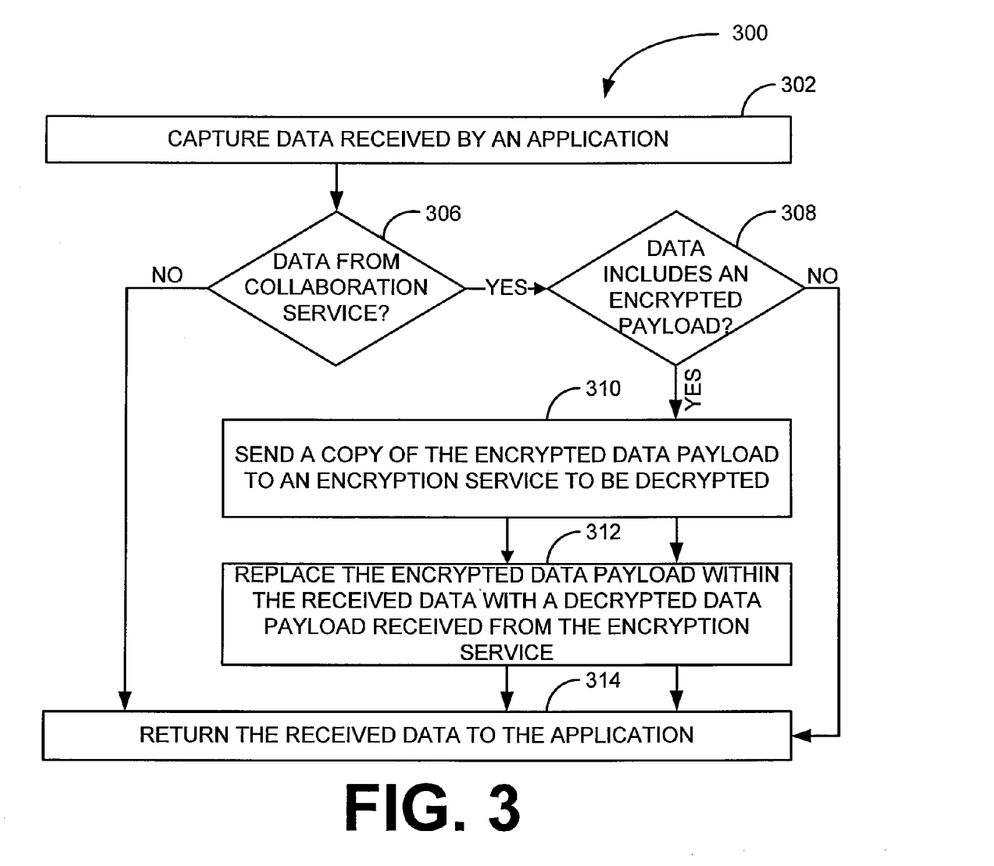
FIG. 3 is a block flow diagram of a method according to an example embodiment.

FIG. 3 is a block flow diagram of a method 300 according to an example embodiment. The method 300 is an example of a method that may be performed by a computer application or application plug-in when retrieving, or otherwise receiving data from a collaboration service over a network. The method 300 includes capturing 302 data received, over the network, by an application performing the method 300. The method 300 then determines 306 if the data was received from the collaboration service. If not, the method 300 returns 314 the received data to the application receiving the data for normal processing. If the data was received from the collaboration service, a further determination is performed to determine 308 if the received data includes an encrypted data payload. If the received data does not include an encrypted data payload, the method 300 returns 314 the received data to the application receiving the data for normal processing. If the data does include an encrypted data payload, the method includes sending 310 a copy of the encrypted data payload to an encryption service to be decrypted. In response, a the data payload is received in a decrypted form from the encryption service and the method 300 includes replacing 312 the encrypted data payload within the received data with the decrypted data payload received from the encryption service. The received data, including the decrypted data payload, is then returned 314 to the application performing the method.

Figure 4:
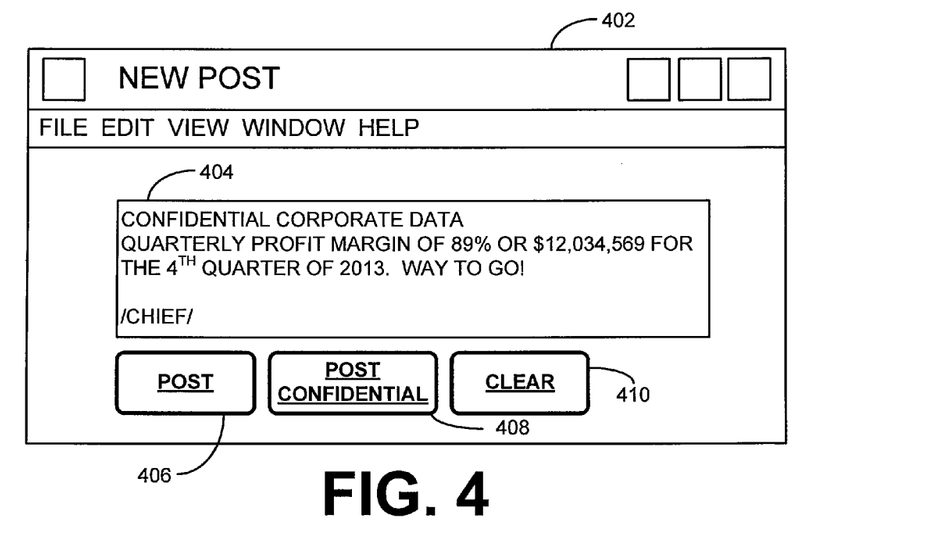
FIG. 4 illustrates a user interface according to an example embodiment.

FIG. 4 illustrates a user interface 402 according to an example embodiment. The user interface 402 is an example user interface 402 of some embodiments that may be used to post data to a collaboration service. The user interface 402 includes a text entry control 404, a post action button 406, a post confidential action button 408, and a clear action button 410. In use, a user enters text to be posted to the collaboration service in the text entry control 404, such as by typing or pasting text into the text entry control 404. The user may select the clear action button 410 to remove text entered into the text entry control 404. Once the user is ready to post text entered into the text entry control 404 to the collaboration service, the user may then select either the post action button 406 or the post confidential action button 408. The post action button 406, when selected, causes the text to be copied from the text entry control 404 and communicated to the collaboration service. When the post confidential action button 408 is selected, the text from text entry control is copied, encrypted according to the embodiments described herein, such as the method 200 illustrated and described with regard to FIG. 2, and then sent to the collaboration service. In some embodiments, all text entered into the text entry control 404 will be encrypted prior to being sent to the collaboration service. Thus, such embodiments may include only one action button for posting text, or other content, to the collaboration service.

Figure 5:
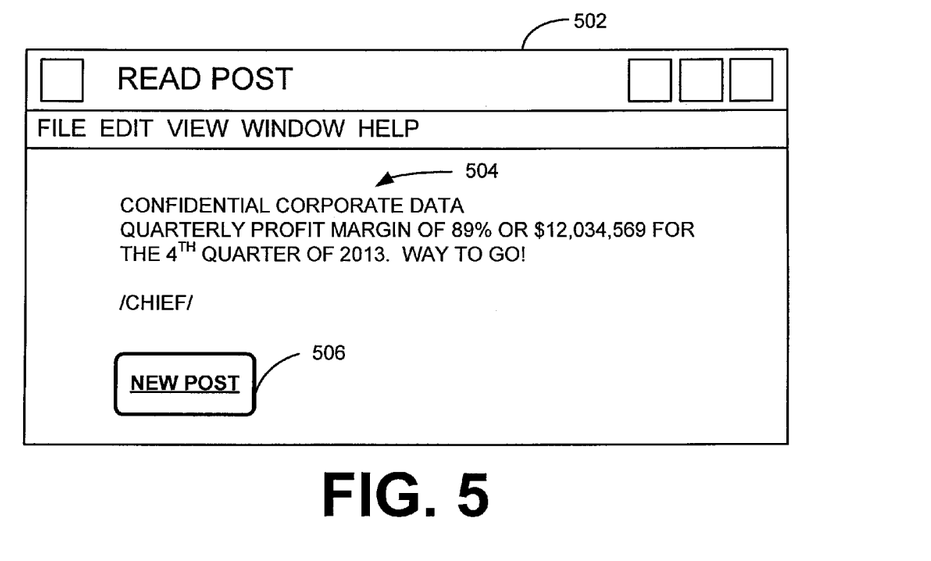
FIG. 5 illustrates a user interface according to an example embodiment.

FIG. 5 illustrates a user interface 502 according to an example embodiment. The user interface 502 is an example of a user interface 502 that may be used to view postings to a collaboration service. The user interface 502 includes text 504 of a posting and a new post action button 506. Selection of the new post action button 506 may cause another user interface to be displayed to a user, such as the user interface 402 as illustrated and described with regard to FIG. 4.

Although only two user interfaces are illustrated and described with regard to FIG. 4 and FIG. 5, these two user interfaces and others may be included in various embodiments depending on the particular client applications, the computing devices, and the collaboration service of the embodiment.

Figure 6:
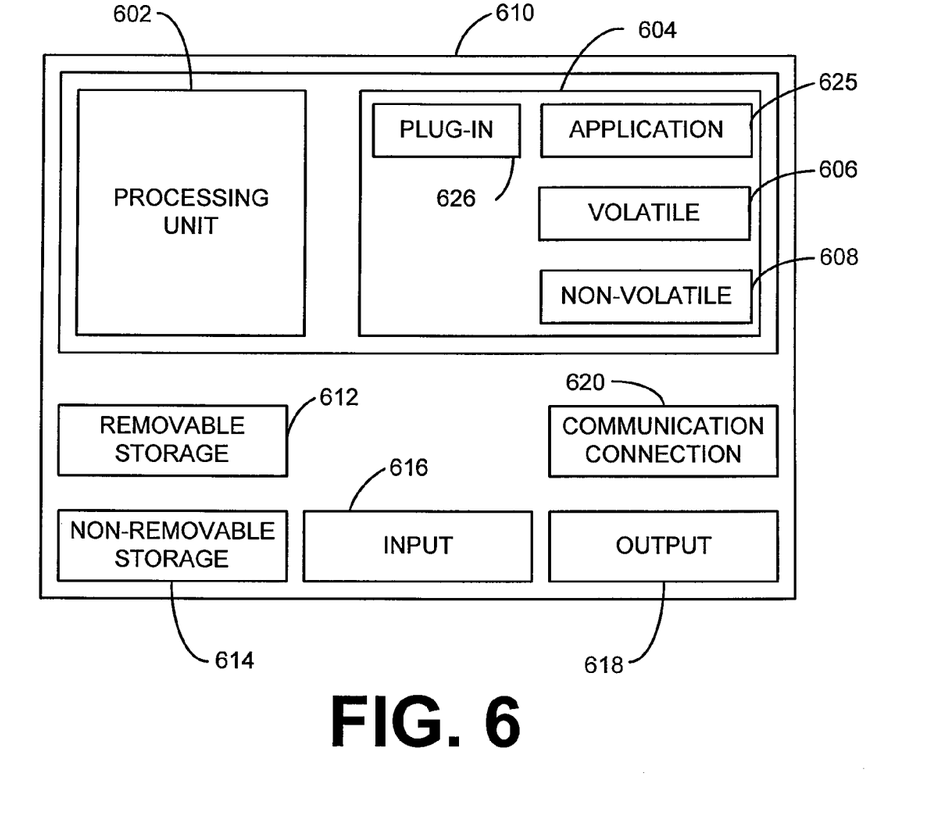
FIG. 6 is a block diagram of a computing device according to an example embodiment.

FIG. 6 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection 620 to connect to one or more remote computers, such as database servers. The communication connection 620 may include one or more network interface devices allowing the computer 610 to connect to one or more different networks. For example, the networks may include a wired or wireless computing network and, in some embodiments, also a mobile telephone network providing data transport services including a data to and from the Internet. The remote computer may include a personal computer (PC), server, router, network PC, a peer device or other common network node, or the like.

Computer-readable instructions stored on a computer-readable storage medium are executable by the processing unit 602 of the computer 610. A hard drive, CD-ROM, and RAM are some examples of articles including a computer-readable storage medium. For example, a computer program 625 capable of communicating on a network via the communication connection 620 with a collaboration service to receive data from the collaboration service for display on an output device 618. The computer program 625 may further be capable of receiving input, the input device 616 for communication to the collaboration service.

The computer-readable storage medium may also include an application plug-in 626 that augments the functionality of the computer program 625 by capturing received input prior to communication to the collaboration service, copying a data payload of the captured input, and sending the data payload to an encryption service, such as over a local area network (LAN). In response, the application plug-in 626 receives the data payload in an encrypted form from the encryption service and replaces the data payload of the captured input with the data payload in the encrypted form. The application plug-in 626 may then return the received input, including the data payload in the encrypted form, to the computer program 625 for communication, via the communication connection 620, to the collaboration service.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of using a publicly accessible collaboration service to share organization-confidential information securely between authorized members of the organization, the method comprising:
    receiving a data payload on a computing device as input for posting to a publicly-accessible, remote collaboration service;
    executing instructions on at least one processor of the computing device to send the data payload to a private cryptographic service;
    receiving the data payload in an encrypted form from the private cryptographic service;
    sending the data payload in the encrypted form to the publicly-accessible collaboration service in a format as specified by a provider of the publicly-accessible collaboration service, the encrypted data payload to be stored by the publicly-accessible collaboration service;
    capturing data received by an application performing the method;
    determining the source of the received data;
    when the source of the received data is not the publicly-accessible collaboration service, returning the received data to the application; and
    when the source of the received data is the publicly-accessible collaboration service:
        determining if the received data includes an encrypted data payload;
        when the received data does not include an encrypted data payload, returning the received data to the application; and
        when the received data includes an encrypted payload:
            sending a copy of the encrypted data payload to the private cryptographic service to be decrypted;
            replacing the encrypted data payload within the received data with a decrypted data payload received from the private cryptographic service; and
            returning the received data, including the decrypted data payload, to the application performing the method;
    wherein only the private cryptographic service can decrypt the encrypted data payload; and
    wherein the private cryptographic service is only accessible to authorized members of the organization.

2. The method of claim 1, wherein the collaboration service is a social network web site.

3. The method of claim 1, wherein the received data payload is received as a data chunk created by an application performing the method according to a transfer protocol of the collaboration service.

4. The method of claim 1, wherein the private cryptographic service is a service operating on a server residing within a networked computing environment of an organization.

5. The method of claim 4, wherein a user of a computing system performing the method is an authenticated user within the networked computing environment of the organization.

6. The method of claim 4, wherein the private cryptographic service performs symmetric encryption.

7. A system comprising:
    at least one processor, at least one memory device, a network interface device, a display device, and at least one input device;

an application stored in the at least one memory device and executable on the at least one processor to:
communicate via the network interface device with a publicly-accessible, remote collaboration service;
receive data from the collaboration service for display on the display device;
receive input, via the at least one input device, for posting to the collaboration service; and
an application plug-in stored in the at least one memory device and executable by the at least one processor to augment the functionality of the application by:
capturing, from the application, received input prior to posting to the collaboration service;
copying a data payload of the captured input;
sending the data payload to a private cryptographic service and, in response, receiving the data payload in an encrypted form;
replacing the data payload of the captured input with the data payload in the encrypted form;
returning the received input, including the data payload in the encrypted form, to the application for posting to the collaboration service
capturing data received by the application from the network interface device;
determining the source of the received data:
when the source of the received data is not the publicly-accessible collaboration service, returning the received data to the application; and
when the source of the received data is the publicly-accessible collaboration service:
determining if the received data includes an encrypted data payload;
when the received data does not include an encrypted data payload, returning the received data to the application; and
when the received data includes an encrypted payload:
sending a copy of the encrypted data payload to the encryption service to be decrypted;
replacing the encrypted data payload within the received data with a decrypted data payload received from the encryption service; and
returning the received data the decrypted data payload, to the application.

8. The system of claim 7, wherein the collaboration service is a social network web site.

9. The system of claim 7, wherein the application is a web browser.

10. The system of claim 7, wherein capturing the received input prior to posting to the collaboration service includes capturing a data chunk generated by the application according to a transfer protocol of the collaboration service prior to posting the data chunk to the collaboration service.

11. The system of claim 7, wherein the private cryptographic service is accessible via the Internet by users authorized to utilize the private cryptographic service, each user authenticated through provision of authentication credentials over the Internet to the private cryptographic service.

12. The system of claim 7, wherein the private cryptographic service is a service operating on a server residing within a networked computing environment of an organization and the publicly-accessible, remote collaboration service is accessible on the Internet.

13. The system of claim 12, wherein sending the data payload to the private cryptographic service includes sending authentication data to the collaboration service that authenticates a user of the application as an authorized user within the networked computing environment of the organization.

14. A non-transitory computer-readable storage medium, with instructions stored thereon, which when executed by a processor of a computer, cause the computer to:
capture data received by an application via a network interface device;
determine the source of the received data;
when the source of the received data is not publicly-accessible collaboration service, return the received data to the application; and
when the source of the received data is the publicly-accessible collaboration service:
determine if the received data includes an encrypted data payload;
when the received data does not include an encrypted data payload, return the received data to the application; and
when the received data includes an encrypted payload:
send a copy of the encrypted data payload to an encryption service to be decrypted;
replace the encrypted data payload within the received data with a decrypted data payload received from the encryption service; and
return the received data, including the decrypted data payload, to the application.

15. The non-transitory computer-readable storage medium of claim 14, wherein the application is a web-enabled application capable of retrieving data from and posting data to the collaboration service via the network interface device.

16. The non-transitory computer-readable storage medium of claim 15, wherein the application presents data retrieved from the collaboration service within at least one user interface defined within an instruction set of the application.

17. The non-transitory computer-readable storage medium of claim 14, wherein the instructions when executed by the processor of the computer, further cause the computer to:
when the data was received from the collaboration service, but does not include an encrypted data payload, returning the received data to the application, wherein the application is capable of displaying, in a single user interface, data received from the collaboration service:
in an encrypted form after the encrypted data has been decrypted; and
in an unencrypted form.

18. The non-transitory computer-readable storage medium of claim 14, wherein the instructions define an application plug-in.

* * * * *